United States Patent [19]
Addison et al.

[11] 3,952,758
[45] Apr. 27, 1976

[54] CANOPY

[76] Inventors: Frank F. Addison; James B. Montgomery, both of Lafayette, La.

[22] Filed: Sept. 3, 1971

[21] Appl. No.: 177,786

[52] U.S. Cl. ............................................ 135/5 AT
[51] Int. Cl. ............................................ E04f 10/00
[58] Field of Search ........ 135/1 A, 4 A, 5 A, 7.1 A; 160/23 R, 120–122, 71

[56] References Cited
UNITED STATES PATENTS

| | | | |
|---|---|---|---|
| 1,659,825 | 2/1928 | MacKay | 135/4 A |
| 1,733,007 | 10/1929 | Dahl | 135/5 A |
| 1,801,711 | 4/1931 | Asher | 135/1 A |
| 2,079,973 | 5/1937 | Knoll | 160/71 |
| 2,825,351 | 3/1958 | Thornton | 135/5 A |
| 3,192,937 | 7/1965 | Carter | 135/7.1 A |

*Primary Examiner*—Peter M. Caun
*Attorney, Agent, or Firm*—Pravel, Wilson & Matthews

[57] ABSTRACT

A new and improved canopy is adapted to be mounted on a vehicle and is movable between a retracted position and an extended position where a cover extends outwardly from the vehicle. In one embodiment of the invention, a substantially enclosed canopy unit is formed by extending covers from opposing sides of a vehicle positioned on a panel floor to form a top and a sidewall attached to the panel floor.

11 Claims, 8 Drawing Figures

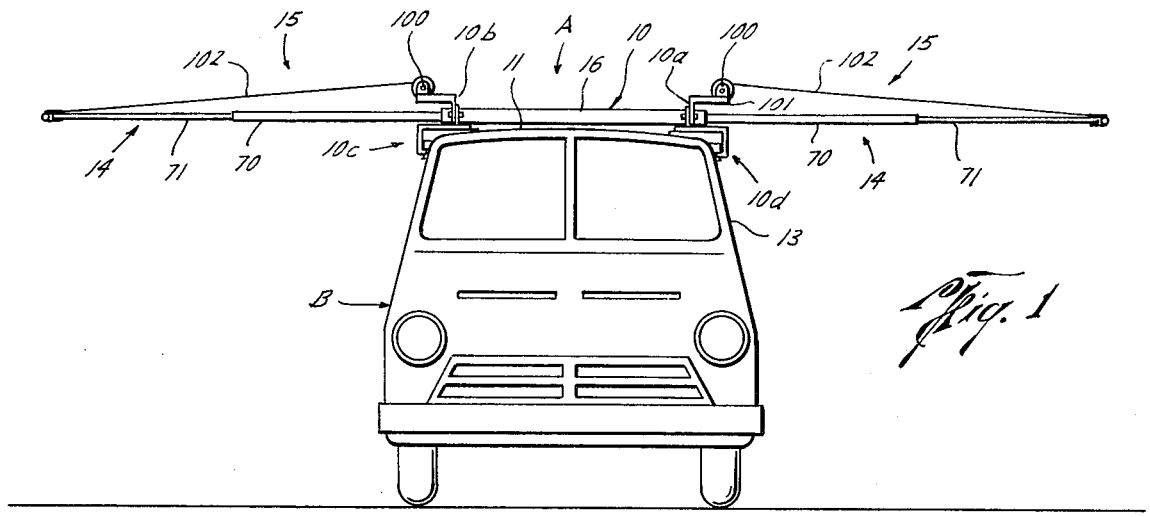
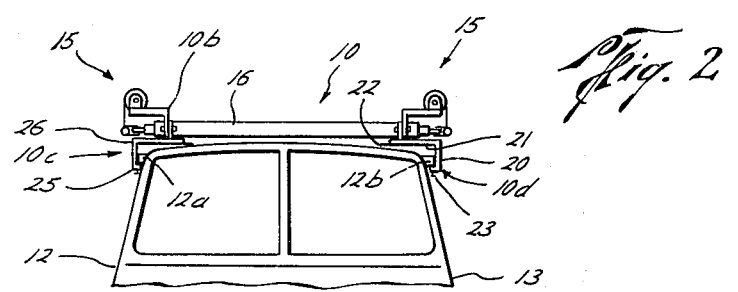
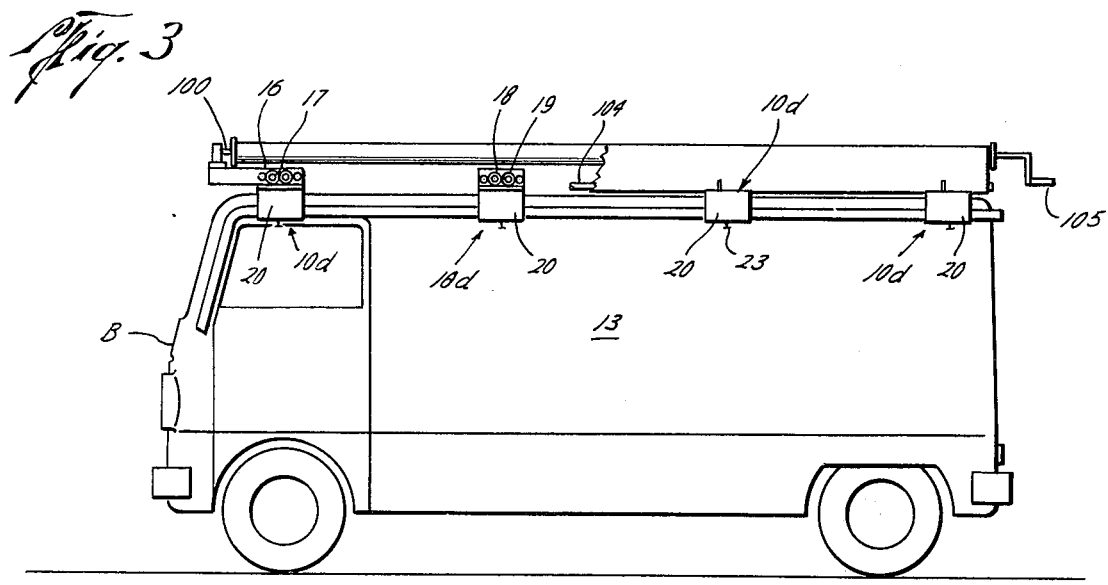

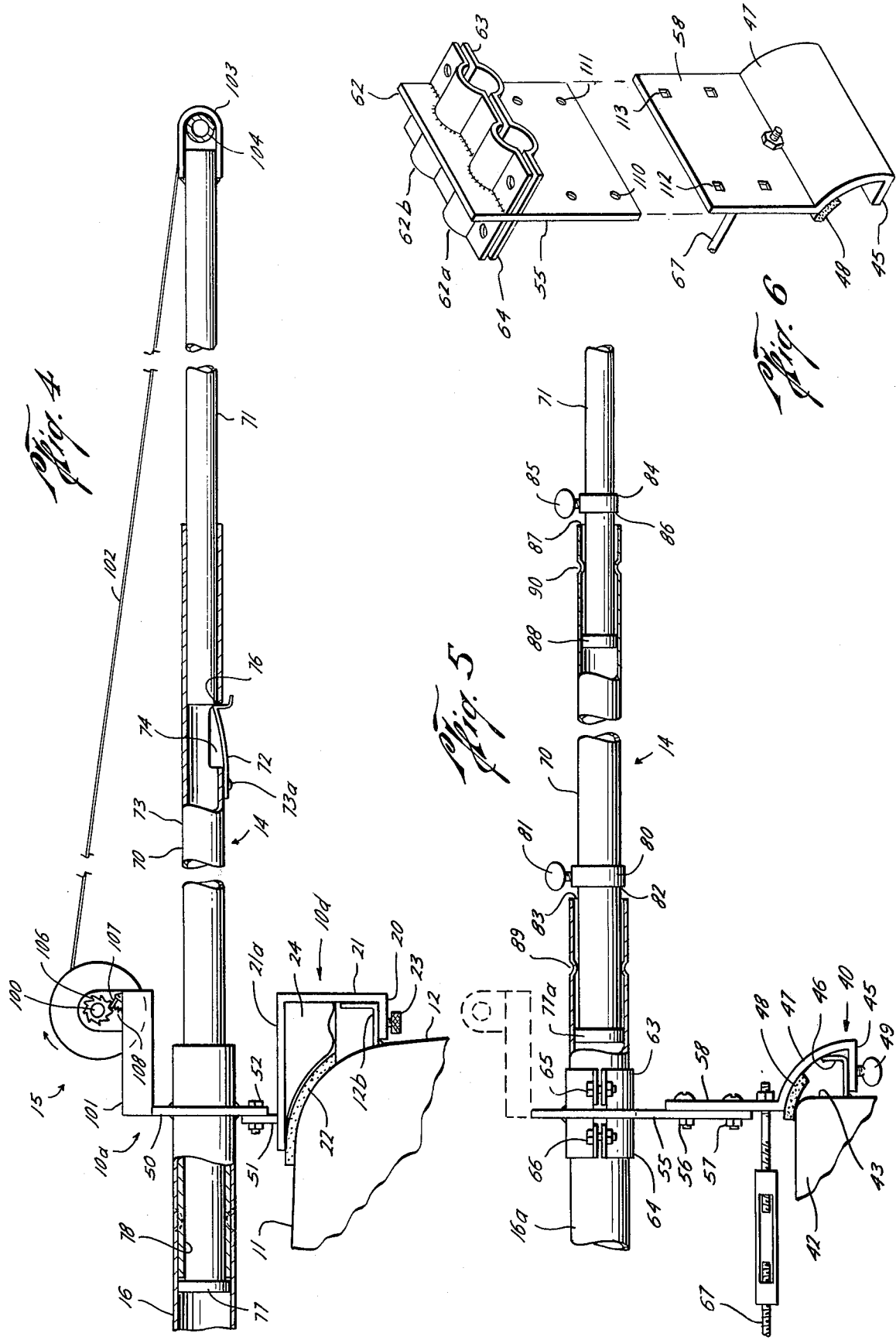

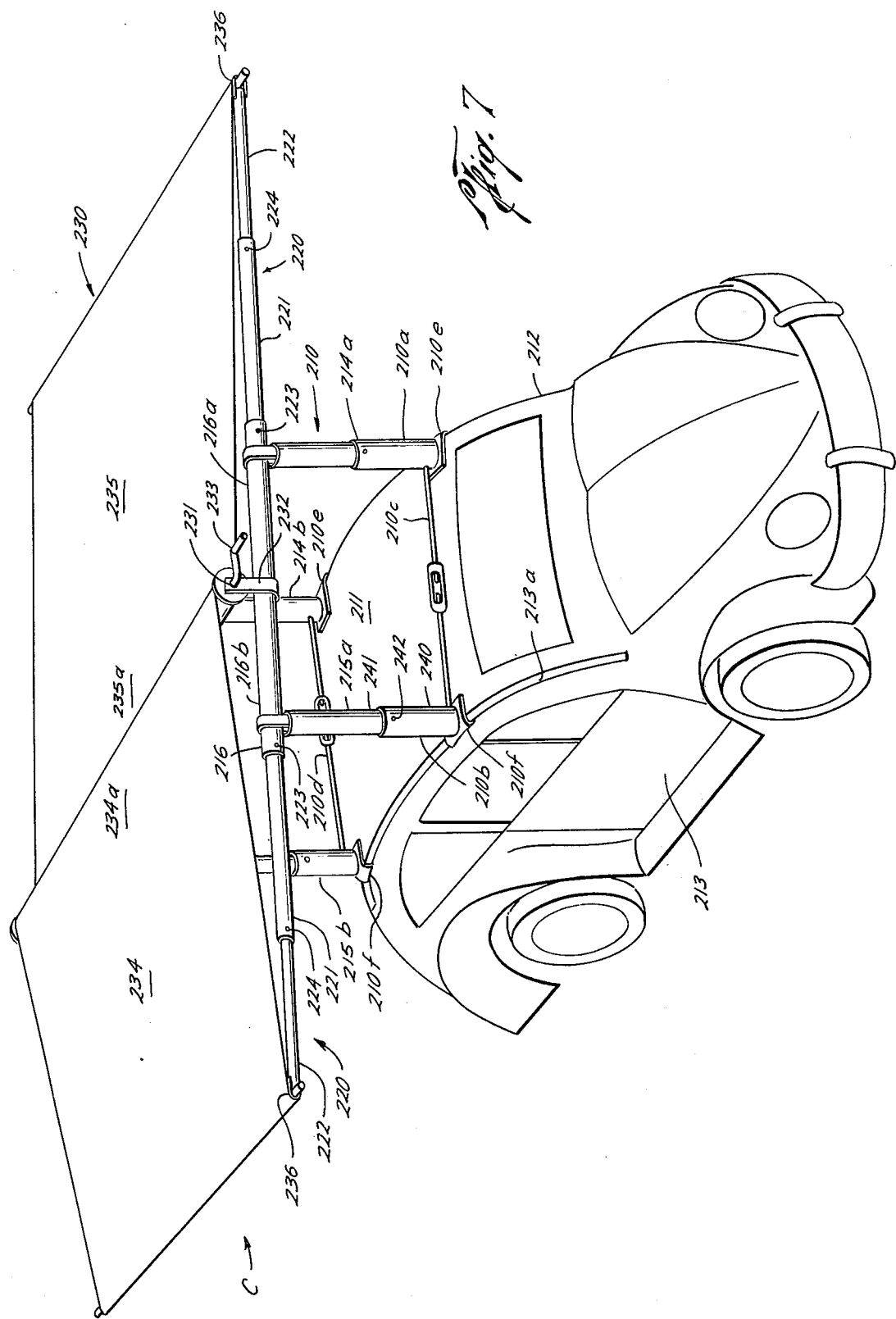

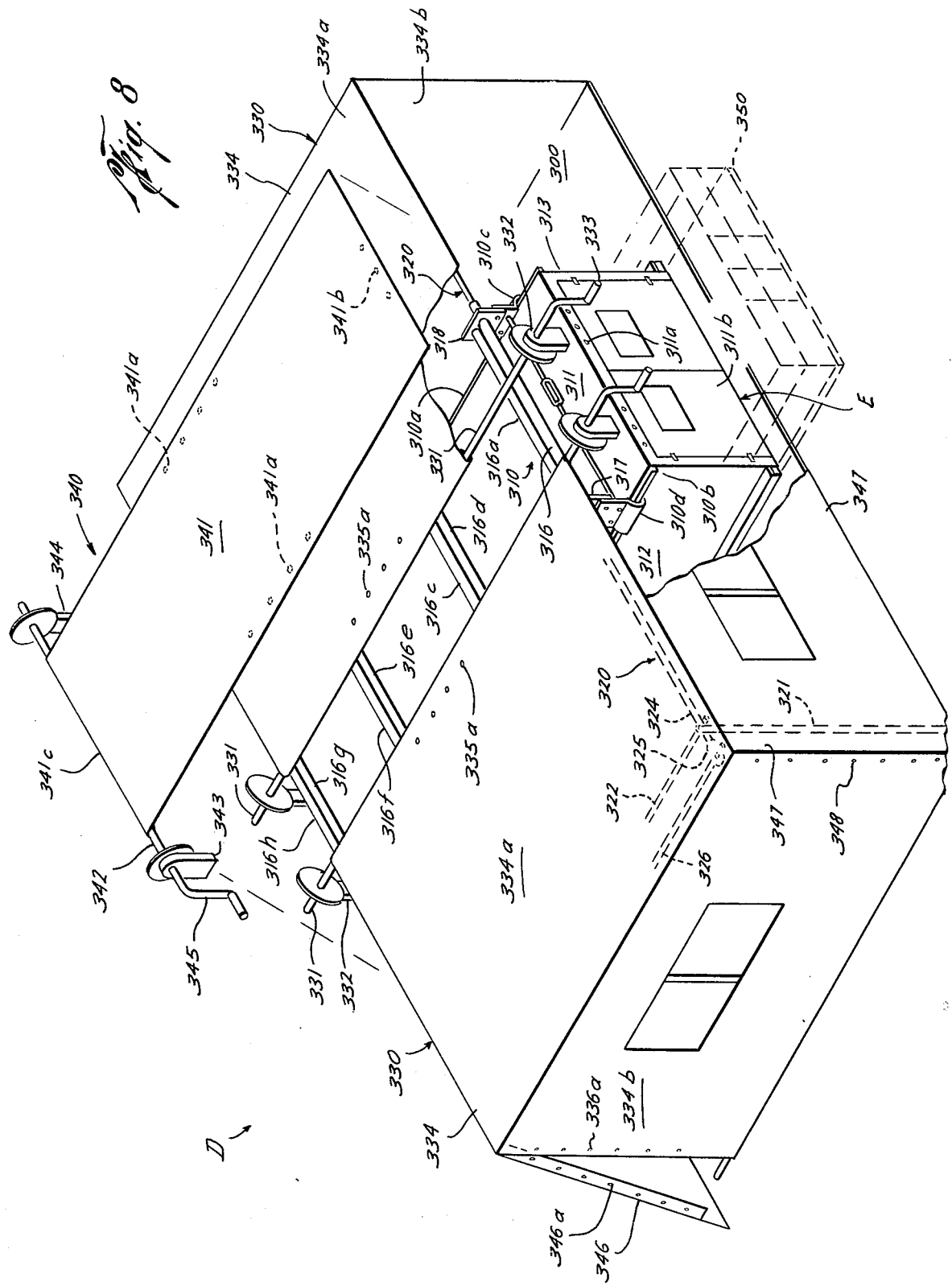

CANOPY

BACKGROUND OF THE INVENTION

The field of this invention is vehicle mounted canopies. Today, many types of trucks such as van type trucks and pickup trucks, with camping enclosures mounted in the load carrying beds, are used for camping. Mobile homes are also widely used for camping; in addition mobile homes are widely used for conveniently traveling to and living in mobile home parks or other camps for somewhat extended periods. These camping units in pickup trucks and in van type trucks as well as mobile homes are relatively inexpensive and thus offer middle class Americans the capability of traveling almost anywhere without having to seek conventional motels or hotels. One problem common to almost all of the camping trucks and mobile homes is that, because the living and sleeping areas are small and quite confining, it is desirable that some sheltered area be provided outside the vehicle so that the inhabitants can work and relax outside and yet be protected from sun and rain.

In the prior art, attempts have been made to provide canopies which extend from vehicles. The canopies described in U.S. Pat. No. 2,788,791, issued to Pospisil et al., and U.S. Pat. No. 1,483,741, issued to Moffet both illustrate canopies or awnings which extend from vehicles; however neither of those units are easily retractable for storage in place on the vehicle, and both units require the additional support of vertical poles.

SUMMARY OF THE INVENTION

It is an object of this invention to provide a new and improved vehicle mounted canopy.

This and other objects of this invention are provided by a retractable canopy adapted to be easily mounted on vehicles such as pickup trucks, van type trucks or mobile homes, and easily extended outwardly to provide a substantially horizontal top which need not be supported by any additional poles or other frame members. The retractable canopy includes rod members which telescope into and out of casing members that are part of the frame mounted on the vehicle. The top is provided by cover which is wound and unwound from a shaft mounted for rotation on the frame so that the cover may be compactly stored in a retracted position. The cover is attached to the rod members so that it may be easily unwound by simply extending the vehicle rod members outwardly of the casing members.

In one embodiment of this invention, a canopy unit is provided which includes not only a top but also sides thereby forming a substantially enclosed unit.

BRIEF DESCRIPTION OF THE DRAWINGS

The preferred embodiment of this invention will be described hereinafter, together with other features thereof, and additional objects will become evident from such description.

The invention will be more readily understood from a reading of the following specification and by reference to the accompanying drawings forming a part thereof wherein an example of the invention is shown and wherein:

FIG. 1 is a elevational view of the vehicle mounted canopy according to one embodiment of this invention, the canopy being in an extended position;

FIG. 2 is a front elevational view of the canopy of FIG. 1 in a retracted position;

FIG. 3 is a side elevational view of the canopy unit of FIG. 1 with a portion of the cover removed;

FIG. 4 is a detailed view of the telescoping means and the frame of this invention of FIG. 1;

FIG. 5 is a detailed view of the telescoping means and frame illustrating a bracket which mounts the canopy on a sharp cornered vehicle roof;

FIG. 6 is a perspective view of the frame of FIG. 5 showing a means for adjusting the height of the telescoping means and cover of this invention;

FIG. 7 is a perspective view of a first alternate embodiment of this invention in which a double cover means extends outwardly from both sides of the vehicle; and FIG. 8 is a perspective view of a second alternate embodiment of this invention illustrating a substantially enclosed canopy unit formed on both sides of a vehicle.

With reference to FIGS. 1–3 of the drawings, a retractable canopy A is illustrated in its extended position on a vehicle B which is a van truck. The retractable canopy A includes a frame 10 with opposing side sections 10a and 10b, adapted to be mounted on the roof 11 and sides 12 and 13 of the van B. A telescoping means 14 is mounted on each opposing side section of the frame and telescopes between the retracted position illustrated in FIG. 2 and the extended position illustrated in FIG. 1 where the telescoping means extends outwardly, horizontally from the van. A cover means 15 is mounted on the opposing side sections 10a and 10b of the frame and is attached to the telescoping means 14 which is mounted on the same side of the frame, and is movable between a retracted position illustrated in FIG. 2 and an extended position illustrated in FIG. 1 so that a sheltered area is provided extending outwardly substantially horizontally from opposing sides of the van.

The side section 10a of the frame is mounted on the roof 11 and the side 13 of the van and the opposing side section 10b is mounted on the roof and side 12 of the van. The opposing side sections 10a and 10b of the frame are connected by outer casing members or pipes such as 16, 17, 18 and 19 as shown in FIGS. 1–3. Of course, it is understood that any number of such outer casing members may be utilized to connect and support the opposing sides of sections 10a and 10b of the frame of the canopy unit.

Referring to FIGS. 1, 2 and 4, the frame 10 includes bracket means 10c which mount the frame side section 10b to the roof and side 12 of the van and bracket means 10d which mount the frame side section 10a to the roof and side 13 of the van. Since bracket means 10c and 10d are identical, only the bracket means 10d, which is illustrated in detail in FIG. 4, will be described in detail. The bracket means 10d includes a first section or lip 20 engaging the underside of the gutter 12b extending from the side 12 of the van. A second section of the bracket means is formed by the members 21 and 21a which form an L-shaped piece attached to the first section 20, the member 21a extending horizontally into engagement with the roof of the van. In order to protect the roof of the vehicle from scratches at the points where the horizontal member 21a engages the roof, a gasket 22 is disposed between the roof and the underside of the member 21a of the second bracket section.

After the frame with the brackets thereon have been positioned on the vehicle, a thumb screw 23 is adjusted so that the lip 20 fits snugly against the underside of the gutter and the member 21a fits against the gasket 21 on the van roof. A gusset 24 may be welded to members 21 and 21a for additional support.

The bracket means 10c includes a first section 25 fitting against the gutter 12a on side 12 of the van and a second section 26 which is mounted on the van roof, the sections being identical to the sections of the bracket means 10d.

Different shapes of vehicles require variations in the bracket means 10c and 10d. For instance, a more rounded corner formed by a vehicle roof and top may require that the members 21 and 21a of the second bracket section be of different sizes.

If the corner formed by the roof and the side of a vehicle is quite sharp as illustrated in FIG. 5, a bracket means 40 attached to a frame side section 41 is mounted on the roof 42 and the side 43 of the vehicle. The bracket means 40 includes a first section or lip 45 which is adapted to engage the underside of the vehicle gutter 46, and a second arcuately shaped section 47 which engages the roof 42 of the vehicle. A gasket 48 protects the roof and a thumb screw 49 secures the bracket to the vehicle.

The frame side sections 10a and 10b are identical except, of course, for being mounted on opposite sides of the van, and therefore only the frame side section 10a, which is shown in FIG. 4 as well as FIGS. 1 and 2, will be described in detail. The frame side section 10a includes a plate 50 which is attached to a stud 51 which is mounted on the member 21a of the bracket means, by bolt and nut combinations such as 52. The outer casing member 16 extends through the plate 50 and is welded thereto. The frame side section 10b supports the outer casing member 16 in a similar manner. And, the other outer casing members such as 17, 18 and 19 are attached to the frame side sections in the same manner as outer casing member 16.

A modified version of the opposing side sections 10a and 10b of the frame is illustrated in FIGS. 5 and 6 where a plate 55 is connected by bolt and nut combinations 56 and 57 to a vertically extending plate 58, which is attached to the arcuately shaped second bracket sections 47. The plate 55 has two half circles (not shown) cut out at the top to receive the outer casing members such as 16a, which may be welded to the plate. An upper bracket 62 includes two half-sleeves 62a and 62b which fit over the outer casing members positioned on plate 55. The outer casing members are clamped to the frame side section 41 by two half-sleeve lower clamps 63 and 64 which are secured to the upper brackets 62 on both sides of the plate 55 by the nut and bolt combinations 65 and 66. One further point regarding the opposing frame side section 41 illustrated in FIGS. 5 and 6 is that tie rods such as 67 may be bolted to the plate 58 of the bracket means 40 on each of the opposing sides of the vehicle in order to further secure the canopy frame in position on the vehicle.

The telescoping means 14 extends from the frame side sections 10a and 10b of the canopy frame and are substantially identical. Referring to FIGS. 1 and 4, each of the telescoping means 14 includes a first pipe or rod member 70 which is slidably mounted in an outer casing member such as member 16. A second pipe or rod member 71 is slidably mounted in the first rod member 70. When the telescoping means is in its retracted position as shown in FIG. 2, the first rod member 70 is retracted substantially into the outer casing member 16 and the second rod member 71 is retracted substantially into the first rod member 70.

As best shown in FIG. 4, when the rod member 70 is extended outwardly, it is supported in a substantially horizontal position within the outer casing member 16 and the rod member 71 is supported in a substantially horizontal position within the rod member 70. In this manner, it is not necessary to provide supplementary support to the telescoping rods.

When the rod members 70 and 71 are in the extended positions, it is necessary that the movement of the rod members toward the retracted position shown in FIG. 2 be limited so that the cover means 15, as will be described hereinafter, will be maintained taut. The means for limiting the movement of the extended rod members 70 and 71 toward the retracted position is a resilient leaf spring 72 which is mounted onto the outer surface 73 of the rod member 70 by a bolt 73a and extends through a hole 74 in the rod member 70 in such a manner that, when the rod member 71 has moved past the spring 72, the spring is moved inwardly and provides a limiting shoulder 76 which prevents movement of the rod member 71 inwardly. Of course, when it is desired to retract the rod member 71, the spring may be pulled outwardly so that the rod member 71 can pass the spring without obstruction.

In order to prevent the rod member 70 from being inadvertently pulled out of the casing member 16, the casing member includes an inner sleeve 78 welded to the inside of the casing member and having an inside diameter slightly larger than the outside diameter of the rod member 70 so that the rod member 70 is slidable through the inner sleeve 78. A collar 77 is mounted on the end of the rod member 70 and engages the inner sleeve 78 as the rod member 70 is moved outwardly. A similar arrangement (not shown) may be used to limit the movement of rod member 71 outwardly if desired.

In FIG. 5, rod members 70 and 71 are mounted in an outer casing member 16a to illustrate another means for limiting the movement of the rods. A collar 80 is mounted over the rod member 70 and is held in place by a thumb screw 81 and has a sufficiently large outside diameter that an inside shoulder 82 of the collar will engage the end 83 of the outside casing member 16a thereby limiting the movement of the rod member inwardly. In a similar manner a collar 84 is mounted over the rod member 71 and secured by the thumb screw 85 in order to provide a shoulder 86 which will engage end 87 of the rod member 70 thereby limiting movement inwardly. Of course, when it is desired to move the telescoping means 14 to the retracted position, the outside collars 80 and 84 are simply removed by means of their respective thumb screws and the rod members 70 and 71 are pushed in the outer casing member 16a.

Another means to prevent the rod members 70 and 71 from being pulled out of the outside casing member 16a and rod member 70, respectively, is illustrated in FIG. 5. A collar 77a is mounted onto rod 70 and, a collar 88 is mounted onto rod 71. The outer casing member 16a is indented at 89 so that the collar 77 will engage the indented portion of the outer casing and thus be limited against further movement outwardly. In a similar manner, the collar 88 engages an indented portion 90 in the rod member 70 so that the rod member 71 is prevented from being moved further outwardly. It is understood, of course, that either the limiting means illustrated in FIG. 4 or in FIG. 5 may be used in the embodiment A of the canopy.

Referring to FIG. 1, a cover means 15 is mounted on each of the opposing side sections 10a and 10b of the frame and is connected to the telescoping means 14 mounted on the same frame side section. Since each cover means 15 is identical, only the cover means 15 illustrated in FIG. 4 will be described in detail, and like numbers will be used in referring to the cover means illustrated in FIG. 1–3. Each cover means 15 includes a shaft 100 which is mounted on a bracket member 101 for rotation. The bracket member 101 is attached to the plate 50 on the opposing side section 10a. A cover 102 is attached to the shaft 100 on one end and is attached to the rod 71 of the telescoping means 15 by means of barss clamps 103, which may be welded to the rod members 71. A horizontally disposed rod 104 is also mounted within the brass clamps 103 and is attached to the cover 102 so that the outside edge of the cover 102 in the extended position is substantially supported. A crank 105 is attached to the shaft 100 as illustrated in FIG. 3 so that the cover 102 may be wound about the shaft 100 by turning the shaft 100 by means of the crank 105 as the rods 71 and 70 are moved inwardly so that the cover 102 is wound very compactly on the shaft 100. And, when it is desired to place the canopy unit in the extended position, the canvas 102 will simply be unwound from the shaft 100 as the rod member 70 and 71 are moved outwardly to their extended positions. A ratchet member 106 may be mounted on the shaft 100 and a lock piece 107 may be resiliently held in engagement with the ratchet by a spring 108 extending between the bracket member 101 and the lock piece.

One additional feature of the opposing side sections 41 of the modified frame illustrated in FIG. 5 is that the height of the telescoping means 14 and the cover means (not shown) may be adjusted upwardly by aligning the holes 110 and 111 in the plate 55 with the holes 112 and 113 in the vertically extending plate 58 of the bracket means 41 and securing the bracket by means of bolt and nut combinations 56 and 57.

A retractable double canopy C, which is an alternate embodiment of this invention, is illustrated in FIG. 7. The retractable double canopy C is similar to the retractable canopy A in that the double canopy is also adapted to be mounted on a vehicle and extend from opposing sides of the vehicle. The double canopy C includes a frame 210 having opposing side portions 210a and 210b mounted on the roof 211 and on the opposing sides 212 and 213 of the vehicle, which in FIG. 7 is obviously a Volkswagon. The opposing side sections 210a and 210b of the frame are secured by tie rods 210c and 210d; and, brackets 210e and 210f mount the remainder of the frame to the roof 211 and gutters such as 213a of the Volkswagon. The frame 210 further includes supporting poles 214a and 214b attached to and extending vertically upwardly from the brackets 210e on opposing frame side 210a. Supporting poles 215a and 215b are attached to and extend vertically upwardly from the brackets 210f on opposing frame side 210b.

The frame 210 further includes a casing member 216 that is mounted onto the supporting poles 214a and 215a. Another casing member (not shown) is mounted onto the supporting poles 214b and 215b.

Each telescoping means 220 for the double canopy C is identical to the telescoping means described for the retractable canopy A and thus includes a rod member 221, which may be a pipe, slidably mounted in the outer casing member 216 and a rod member 222 slidably mounted in the rod member 221. The rod members 221 and 222 are mounted in and extendible from both sides 216a and 216b of the outer casing member. Of course, telescoping means identical to that just described extends from the casing member (not shown) mounted on the supporting poles 214b and 215b. The rod members 221 and 222 may be held in their extended position using the leaf spring arrangement illustrated in FIG. 4 or the outwardly mounted collars 80 and 84 illustrated in FIG. 5. Or, set screws 223 and 224 may be threadably mounted in the outer casing member 216 and the rod member 221, respectively, and can be rotated into engagement with the rod members 221 and 222, respectively, in order to maintain the rod members in the extended position.

In the double canopy embodiment C, a double cover means 230 is mounted on the frame 210 and connected to each of the telescoping means 220 extending from the opposing sides 210a and 210b of the frame. The double cover means is movable between retracted and extended positions in conjunction with the telescoping means 220 mounted on each side of the vehicle.

The double cover means 230 comprises a shaft 231 mounted for rotation in supporting brackets such as 232 connected to the outer casing member 216; and, a crank 233 is connected to the shaft 231 so that the shaft may be rotated manually. The double cover means 230 includes a first cover 234 and a second cover 235, which are mounted at ends 234a and 235a on the shaft 231 and are attached to the rods 222 by means of the U-shaped brackets 236. Both of the covers 234 and 235 are wound about the shaft 231 when the cover means is in its retracted position and both covers extend from the shaft with the telescoping means when the telescoping means is in its extended position.

Each of the supporting poles 214a, 214b, 215a and 215b include an adjustable means for adjusting the height of the telescoping means 220 and the double cover means 230. Since the adjustable means is identical for each supporting pole, it will only be described with respect to the supporting pole 215a. Supporting pole 215a includes a outer first pole or pipe which is connected to the bracket means 210f and a second pole 241 which is slidably mounted in the first pole 240. In order to adjust the height of the cover means and telescoping means to any height desired, it is only necessary to rotate a set screw 242, threadedly extending through the first pole 240, into engagement with the second pole 241 in a manner that is well known.

A collapsible, substantially enclosed canopy unit D, illustrated in FIG. 8, provides the second alternate embodiment of this invention. The enclosed canopy unit D includes a floor panel 300. A vehicle E, which in the embodiment in FIG. 8 is a van type truck, is positioned on the floor panel 300. A frame 310 includes opposing side sections 310a and 310b mounted onto the roof 311 and the opposing sides 312 and 313 of the van. The frame 310 is substantially identical to the frame for the canopy unit A in that it includes brackets such as 310c and 310d which mount the frame sections onto the van E. Outer casing members or pipes 316a and 316b are attached to a plate 317 mounted on the bracket 310d and the plate 318 mounted on the bracket 310c. In a similar manner outer casing members 316c, 316d, 316e, 316f, 316g and 316h are mounted on and extend between the opposing side sections 310a and 310b of the frame.

Telescoping means 320 are slidably mounted in both sides of each of the casing members and are movable between extended and retracted positions just as the telescoping means 14 for the canopy unit A and the telescoping means 220 for the retractable double canopy C. However, in this embodiment D, a plurality of vertically extending support poles such as 321 are supported on the floor panel 300 and are connected to the telescoping means 320 extending from some of the outer casing members 316. Further support is provided by the horizontally extending member 322 which is connected to the rod member 324 of the telescoping means 320 in any suitable manner such as by using clamps (not shown). A sleeve 325 is mounted onto the end of each of the rod members 324 of the telescoping means; and a horizontally extending member 326 is supported by the sleeves 325 mounted on the rods 324 in order to form a corner between the top and a side, which will be described in more detail later.

Two side cover means 330 are mounted on the roof 311 of the vehicle and extend from each of the sides 312 and 313 of the vehicle outwardly. Each side cover means 330 operates substantially in a manner similar to the cover means 15 of the canopy unit A and thus each side cover means includes a shaft 331 mounted for rotation on brackets 332 which are attached to the roof 311 of the vehicle. A crank 333 is connected to the shaft 331 so that the shaft may be manually rotated. Each of the side cover means 330 further includes a side cover 334 which is attached to the shaft 331 and, in its extended position extends horizontally therefrom over the horizontally positioned member 326 and extends vertically downwardly into connection with the floor panel 300 in order to provide both a top 334a and a side 334b for the substantially enclosed canopy unit.

A middle cover means 340 includes a middle cover 341 having on its underside snap members such as 341a which are aligned with cooperating snap members 335a in the tops 334a. In this manner the middle cover 341 may be snapped onto the side cover tops 334a in order to provide a continuous top for the substantially enclosed canopy unit. A plurality of snap members 341b are adapted to engage cooperating snap members 311a mounted on back end 311b of the van. The cranks 333 are removably mounted on the shafts 331 by any suitable means such as a cotter pin connection (not shown) so that the middle cover can be attached to the back end of the van.

End 341c of the middle cover 341 is attached to a shaft 342 which is mounted for rotation on the front portion of the van (not shown) by the mounting blocks 343 and 344 in a manner similar to the shafts 331 for the side cover means being mounted on the mounting blocks 332 on the roof 311 of the van. A crank 345 is attached to the shaft 342 so that the middle cover 341 may be wound about the shaft to a retracted position.

Front walls such as 346 are connected to the side walls 334b by means of the snap members 346a and 336a, and to the top walls 334a and to the van by means of snaps (not shown). Further, back walls 347 are connected to the top walls 334a and to the van of the truck also by means of snaps (not shown). At least one of these walls on each side of the van (not shown) may have a door mounted therein so that each side of the van actually provides a substantially enclosed but easily accessible unit. One of the advantages of this type of arrangement is that a private enclosure is formed on each side of the van. Another advantage of the substantially enclosed canopy unit D is that the floor panel 300 protects people from the inconveniences of wet ground and the entry into the enclosed canopy area of vermins.

One additional feature of the substantially enclosed canopy unit D is that a porch 350 may be mounted onto the back 311b of the van in order to provide an additional convenience area.

The foregoing disclosure and description of the invention are illustrative and explanatory thereof, and various changes in the size, shape and materials as well as in the details of the illustrated construction may be made without departing from the spirit of the invention.

We claim:

1. A retractable canopy adapted to be mounted on a vehicle and extendable sidewardly from opposing sides thereof, comprising:
    a. a frame adapted to be mounted on top of said vehicle, said frame having opposing side sections and including a plurality of outer casing members transversely mounted on each of said opposing side sections;
    b. telescoping means slidably mounted in each outer casing member to provide a plurality thereof on each opposing side section of said frame for telescoping between a retracted position where said telescoping means are disposed substantially in said outer casing members, and an extended position, where said telescoping means extend outwardly from opposing sides of said vehicle and are supported by said casing members; and
    c. a cover means mounted on said frame and connected to each of said telescoping means, the cover means including:
        1. a first shaft member mounted for rotation on one side section of said frame;
        2. a first cover attached at one end to the first shaft member and at the opposing end to the telescoping means mounted on said one side section;
        3. a second shaft member mounted for rotation on the opposing side section of said frame; and
        4. a second cover attached at one end to said second shaft member and at the opposite end to the telescoping means mounted on said opposing side section, whereby said first and second covers are respectively wound on said first and second shaft members in said retracted position and are respectively unwound from said shaft members in said extended position from opposing sides to provide a canopy for said vehicle;
    d. vertically extendable mounting means for mounting said telescoping means on said frame; and
    e. means for extending said mounting means whereby the height of said telescoping means and said cover means above the top of said vehicle is controlled.

2. The device set forth in claim 1 wherein said frame includes:
bracket means mounting said frame on a gutter on the vehicle.

3. The device set forth in claim 2 wherein said bracket means includes:
a. a first section engaging the underside of the vehicle gutter;
b. a second section attached to said first section and engaging the roof of the vehicle; and
c. an adjustable means for securing said first and second sections against the gutter and the roof, respectively.

4. The device set forth in claim 1 including:
a crank connected to said shaft whereby said cover may be wound about said shaft as said telescoping means is retracted.

5. The device set forth in claim 1 including:
limiting means mounted with said outer casing members and with said telescoping means for limiting the movement of said telescoping means whereby said telescoping means are maintained in said extended position.

6. The device set forth in claim 1 wherein each of said telescoping means includes:
a. a first rod member mounted for slidable movement in said outer casing member; and
b. a second rod member mounted for slidable movement in said first rod member whereby said first and second rod members are disposed substantially in said outer casing when said telescoping means is in said retracted position.

7. The device set forth in claim 6 including:
limiting means mounted on said outer casing member and on said first and second rod members for limiting the movement of said first and second rod members from said extended position to said retracted position.

8. The device set forth in claim 6 including:
a leaf spring mounted on said first rod member and having a shoulder for engaging said second rod member in said extended position to maintain said second rod member in said extended position.

9. A retractable double canopy adapted to be mounted on a vehicle and extend from opposing sides of the vehicle, comprising:
a. a frame adapted to be mounted on the top of said vehicle having opposing side sections mounted on opposing sides of the vehicle;
b. telescoping means mounted on each of said opposing side portions of said frame for telescoping between a retracted position and a position extending outwardly from the opposing sides of the vehicle; and
c. a double cover means mounted on said frame and connected to each of said telescoping means, said double cover means being movable between retracted and extended positons and including:
1. a shaft mounted for rotation on said frame;
2. a first cover attached to said shaft at one end and to one of said telescoping means at the other end; and
3. a second cover attached to said shaft at one end and to the other of said telescoping means at another end, said first and second covers being wound on said shaft in said retracted position and extending with said telescoping means in said extended position whereby said first and second covers extend from opposing sides of said vehicle to provide a double canopy for said vehicle;
d. vertically extendable mounting means for mounting said telescoping means on said frame; and
e. means for extending said mounting means whereby the height of said telescoping means and said cover means above the top of said vehicle is controlled.

10. The device set forth in claim 9 including:
a. said frame includes an outer casing member; and
b. each of said telescoping means is slidably mounted in said outer casing member for movement between said retracted position where said telescoping means is disposed substantially in said outer casing member and said extended position where said telescoping means extends substantially outwardly of and is supported by said casing member.

11. The device set forth in claim 10 wherein each of said telescoping means includes:
a. a first rod member mounted for slidable movement in said outer casing member; and
b. a second rod member mounted for slidable movement in said first rod member whereby said first and second rod members are disposed substantially in said outer casing when said telescoping means is in said retracted position.

* * * * *